(12) United States Patent
Fujikawa et al.

(10) Patent No.: US 9,169,897 B2
(45) Date of Patent: Oct. 27, 2015

(54) FRICTION DRIVE BELT AND AUTOMOTIVE ACCESSORY DRIVE BELT TRANSMISSION SYSTEM USING THE SAME

(75) Inventors: Tomoyuki Fujikawa, Kobe (JP); Shigeki Okuno, Kobe (JP); Eijiro Nakashima, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 821 days.

(21) Appl. No.: 12/671,018

(22) PCT Filed: Jul. 4, 2008

(86) PCT No.: PCT/JP2008/001799
§ 371 (c)(1),
(2), (4) Date: Jan. 27, 2010

(87) PCT Pub. No.: WO2009/016797
PCT Pub. Date: Feb. 5, 2009

(65) Prior Publication Data
US 2010/0203994 A1 Aug. 12, 2010

(30) Foreign Application Priority Data

Jul. 27, 2007 (JP) ................................ 2007-195679

(51) Int. Cl.
*F16G 1/00* (2006.01)
*F16G 5/00* (2006.01)
(Continued)

(52) U.S. Cl.
CPC ... *F16G 5/20* (2013.01); *C08K 3/04* (2013.01); *F16G 1/08* (2013.01); *F16G 1/28* (2013.01); *F16G 5/06* (2013.01); *C08K 7/02* (2013.01)

(58) Field of Classification Search
CPC ..... C08L 21/00; C08L 23/16; C08L 2666/24; C08L 2666/02; C08L 2666/08
USPC ...... 474/61, 62, 263, 237, 238, 264
See application file for complete search history.

(56) References Cited

U.S. PATENT DOCUMENTS 63,266 A * 3/1867 Lewis .............................. 474/62
110,955 A * 1/1871 Butler ............................. 474/62
(Continued)

FOREIGN PATENT DOCUMENTS

JP 3-219147 A 9/1991
JP 7-4470 A 1/1995
(Continued)

OTHER PUBLICATIONS

International Search Report for PCT/JP2008/001799 mailed Jul. 29, 2008.

*Primary Examiner* — Henry Liu
(74) *Attorney, Agent, or Firm* — Roberts Mlotkowski Safran & Cole, PC

(57) ABSTRACT

A friction drive belt (B) includes short fibers (14) and carbon black (18) both scattered so as to be exposed at a surface of at least a contact part (13) of a rubber belt body (10) with a pulley. The short fibers (14) include short, high modulus fibers made of polymers having a main chain which does not contain an aromatic compound and having an initial tensile resistance, measured according to JIS L 1013, of equal to or greater than 100 cN/dtex, and the carbon black (18) contain large-particle-diameter carbon black having an iodine absorption, measured according to JIS K 6217-1, of equal to or less than 40 g/Kg, and/or a specific surface area, measured by nitrogen adsorption according to JIS K 6217-2, of equal to or less than 40 m$^2$/g.

9 Claims, 5 Drawing Sheets

(51) Int. Cl.
*F16G 9/00* (2006.01)
*F16G 5/20* (2006.01)
*C08K 3/04* (2006.01)
*F16G 1/08* (2006.01)
*F16G 1/28* (2006.01)
*F16G 5/06* (2006.01)
*C08K 7/02* (2006.01)

(56) References Cited

U.S. PATENT DOCUMENTS

| | | | | |
|---|---|---|---|---|
| 2,347,798 | A | * | 5/1944 | Relling .................. 474/265 |
| 2,596,053 | A | * | 5/1952 | Stueland ................ 180/292 |
| 2,872,831 | A | * | 2/1959 | Wood .................. 74/665 GB |
| 4,739,005 | A | * | 4/1988 | Araki et al. ............... 524/496 |
| 4,822,844 | A | * | 4/1989 | Kawakami et al. ........... 524/496 |
| 5,227,425 | A | * | 7/1993 | Rauline ................... 524/493 |
| 6,355,728 | B1 | * | 3/2002 | Kawazura et al. ............... 525/98 |
| 6,378,582 | B1 | * | 4/2002 | Sandstrom et al. ........ 152/209.1 |
| 2004/0214674 | A1 | * | 10/2004 | Tachibana et al. ............. 474/237 |
| 2005/0043486 | A1 | * | 2/2005 | Okuno ..................... 525/193 |
| 2007/0060431 | A1 | * | 3/2007 | Hineno et al. ................ 474/263 |
| 2007/0235692 | A1 | * | 10/2007 | Wu et al. ..................... 252/500 |
| 2007/0249452 | A1 | * | 10/2007 | South ........................ 474/263 |

FOREIGN PATENT DOCUMENTS

| | | |
|---|---|---|
| JP | 09-303487 | 11/1997 |
| JP | 10-213184 A | 8/1998 |
| JP | 2003-314624 A | 11/2003 |
| JP | 2005-076705 | 3/2005 |
| JP | 2005-281629 | 10/2005 |
| JP | 2006-118661 A | 5/2006 |
| JP | 2006-183805 A | 7/2006 |
| JP | 2006-316812 A | 11/2006 |

\* cited by examiner

FIG. 5
(a)
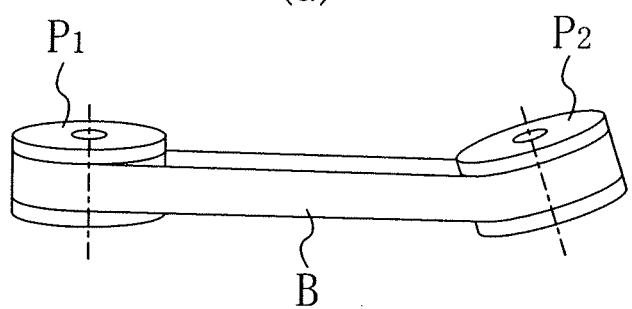
(b)
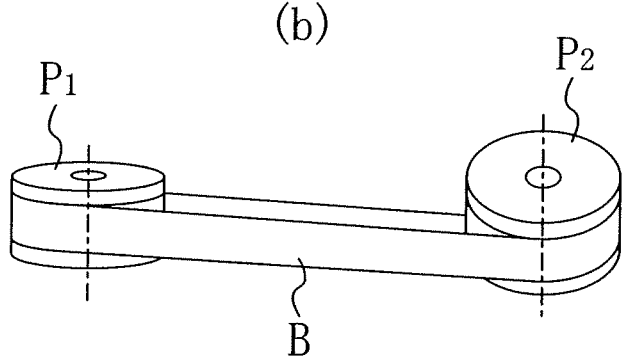

FRICTION DRIVE BELT AND AUTOMOTIVE ACCESSORY DRIVE BELT TRANSMISSION SYSTEM USING THE SAME

TECHNICAL FIELD

The present invention relates to friction drive belts in each of which at least a contact part of a belt body with a pulley is made of a rubber composition, and automotive accessory drive belt transmission systems using the same.

BACKGROUND ART

In a friction drive belt, such as a raw-edged V-belt or V-ribbed belt, in which a compression rubber layer forming a contact part of a belt body with a pulley is made of a rubber composition, it is a generally known technique to blend carbon black into the rubber composition used for the compression rubber layer.

For example, PATENT DOCUMENT 1 shows that a compression rubber layer of a V-ribbed belt is made of a rubber composition containing (A) 20-60 parts by weight of carbon black having a specific surface area, measured by nitrogen adsorption, of equal to or greater than 70 m$^2$/g and a dibutyl phthalate absorption of less than 100 cm$^3$/100 g, and (B) 15-55 parts by weight of carbon black having a specific surface area, measured by nitrogen adsorption, of less than 70 m$^2$/g and a dibutyl phthalate absorption of less than 100 cm$^3$/100 g per 100 parts by weight of rubber. The document describes that this composition of the compression rubber layer can improve the wear resistance, endurance, and quieter performance thereof.

PATENT DOCUMENT 2 shows that a compression rubber layer of a drive belt is made of an ethylene/α-olefin copolymer rubber composition which contains 50 or more parts by weight of carbon black per 100 parts by weight of rubber and in which the carbon black includes 30 or more parts by weight of large particle carbon black having an iodine absorption of equal to or less than 40 mg/g per 100 parts by weight of rubber. The document describes that this composition prevents the life of the drive belt from being shortened and allows the improved advantage of noise reduction to continue for a long time.

Furthermore, in a friction drive belt, it is also a generally known technique to blend short fibers into a rubber composition used for a compression rubber layer.

For example, PATENT DOCUMENT 3 shows that the amount of reinforcing short fibers blended into a compression rubber layer of a drive belt is 15-30 parts by mass per 100 parts by mass of rubber, and the amount of short vinylon fibers blended into the compression rubber layer is 1-4 times greater than that of nylon fibers blended thereinto. The document describes that the above amounts of blended fibers can improve the dynamic fatigue life of the drive belt and further stabilize the friction coefficient thereof without reducing the processability of rubber.

PATENT DOCUMENT 4 shows that short nylon fibers, short vinylon fibers, and other fibers are blended into a compression rubber layer of a V-ribbed belt and the short fibers are arranged to protrude beyond the surface of the belt and increase in cross-sectional area. The document describes that this arrangement can prevent abnormal noise due to stick-slip phenomena.

PATENT DOCUMENT 5 shows that short aramid fibers and short non-aramid fibers are both blended into a compression rubber layer of a V-ribbed belt, and that some of only the short aramid fibers protrude beyond the surface of the belt while some of the short non-aramid fibers are exposed at the surface of the belt in order to prevent the protruding short aramid fibers from being embedded in the belt. The document describes that this can solve completely different problems, i.e., belt wear and slip caused due to an increase in the time during which the belt runs.

PATENT DOCUMENT 6 shows that soluble short fibers are blended into a compression rubber layer of a V-ribbed belt. This can reduce the belt slip ratio and attenuate noises during the belt run.

PATENT DOCUMENT 7 shows that short fibers of gellable polyvinyl alcohol subjected to an RFL treatment are blended into a compression rubber layer of a V-ribbed belt. The document describes that this can effectively prevent a reduction in the drive capability of the drive belt and abnormal noise both arising from slips of the drive belt upon exposure thereof to water.

PATENT DOCUMENT 1: Japanese Patent Publication No. 2006-183805
PATENT DOCUMENT 2: Japanese Patent Publication No. 2006-316812
PATENT DOCUMENT 3: Japanese Patent Publication No. H10-213184
PATENT DOCUMENT 4: Japanese Patent Publication No. H03-219147
PATENT DOCUMENT 5: Japanese Patent Publication No. H07-004470
PATENT DOCUMENT 6: Japanese Patent Publication No. 2003-314624
PATENT DOCUMENT 7: Japanese Patent Publication No. 2006-118661

SUMMARY OF THE INVENTION

A friction drive belt of the present invention includes short fibers and carbon black both scattered so as to be exposed at a surface of at least a contact part of a rubber belt body with a pulley.

The short fibers include short, high modulus fibers made of polymers having a main chain which does not contain an aromatic compound and having an initial tensile resistance, measured according to JIS L 1013, of equal to or greater than 100 cN/dtex, and the carbon black contains large-particle-diameter carbon black having an iodine absorption, measured according to JIS K 6217-1, of equal to or less than 40 g/Kg, and/or a specific surface area, measured by nitrogen adsorption according to JIS K 6217-2, of equal to or less than 40 m$^2$/g.

An automotive accessory drive belt transmission system of the present invention includes a V-ribbed belt wrapped around three or more pulleys including a pair of ribbed pulleys.

The V-ribbed belt is a rubber V-ribbed belt including a plurality of V-ribs which extend inward of the belt and in a lengthwise direction of the belt and are arranged in parallel with each other in a widthwise direction of the belt, and includes short fibers and carbon black both scattered so as to be exposed at a surface of at least a contact part of a body of the V-ribbed belt with a pulley, the short fibers include short, high modulus fibers made of polymers having a main chain which does not contain an aromatic compound and having an initial tensile resistance, measured according to JIS L 1013, of equal to or greater than 100 cN/dtex, and the carbon black contains large-particle-diameter carbon black having an iodine absorption, measured according to JIS K 6217-1, of equal to or less than 40 g/Kg, and/or a specific surface area, measured by nitrogen adsorption according to JIS K 6217-2, of equal to or less than 40 m²/g.

BRIEF DESCRIPTION OF THE DRAWINGS

FIG. 1 is a perspective view of a V-ribbed belt.
FIG. 2 illustrates diagrams illustrating a method for fabricating a V-ribbed belt.
FIG. 3 is a layout of pulleys in an accessory drive belt transmission system.
FIG. 4 is a diagram illustrating misalignment arising from displacement of pulleys.
[FIG. 5]
FIGS. 5(a) and 5(b) are diagrams illustrating misalignment arising from inclined pulleys.
FIG. 6 is a diagram illustrating how to determine the amount of misalignment between pulleys.
FIG. 7 is a layout of pulleys in a belt running tester.

DESCRIPTION OF EMBODIMENT

An embodiment will be described below in detail with reference to the drawings.

Figure 1:
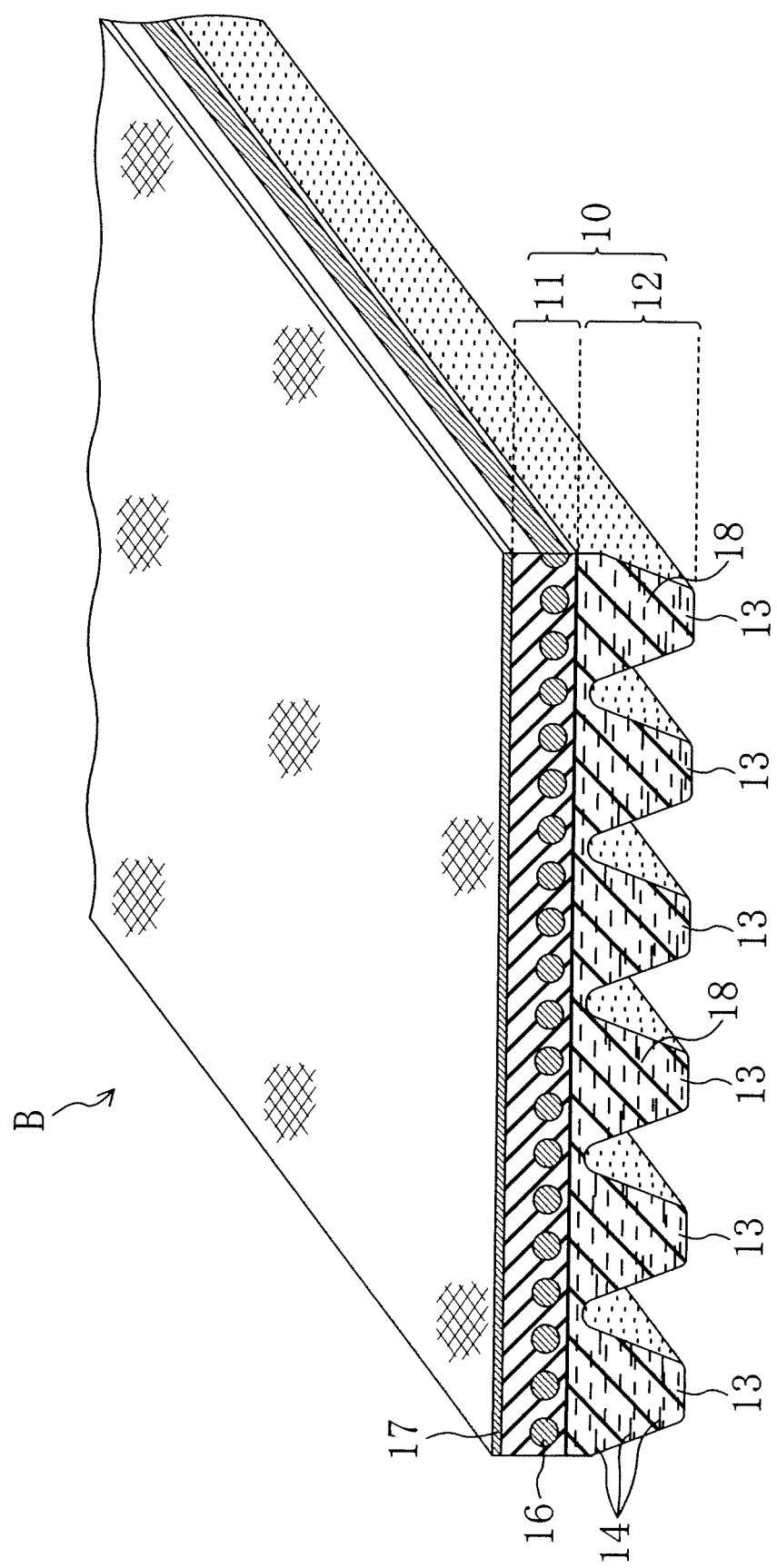
[FIG. 1]

FIG. 1 illustrates a V-ribbed belt B according to this embodiment. The V-ribbed belt B is used for, e.g., an accessory drive belt transmission system placed in an automotive engine compartment, and is formed with a length of 700-3000 mm, a width of 10-36 mm and a thickness of 4.0-5.0 mm.

The V-ribbed belt B includes a V-ribbed belt body 10 formed in a double layered structure including an adhesion rubber layer 11 forming an outer part and a compression rubber layer 12 forming an inner part. A reinforcement fabric 17 is adhered to the outer face of the V-ribbed belt body 10. Furthermore, the adhesion rubber layer 11 has a cord 16 embedded therein in a spiral with a certain pitch in the belt widthwise direction.

The adhesion rubber layer 11 is formed in the shape of a strip of long rectangular cross section and has a thickness of 1.0-2.5 mm, for example. The adhesion rubber layer 11 is made of a rubber composition in which various compounding ingredients are blended into raw rubber material. Examples of the raw rubber material of the rubber composition forming the adhesion rubber layer 11 include ethylene-α-olefin elastomer rubber, such as ethylene-propylene rubber (EPR) and ethylene-propylene-diene monomer rubber (EPDM), chloroprene rubber (CR), chlorosulfonated polyethylene rubber (CSM), and hydrogenated acrylonitrile-butadiene rubber (H-NBR). Out of them, ethylene-α-olefin elastomer rubber is preferable in terms of its environmental friendliness and performance, such as its abrasion resistance and crack resistance. Examples of the compounding ingredients include crosslinkers (e.g., sulfur, organic peroxides, etc.), antioxidants, processing aids, plasticizers, reinforcers, such as carbon black, and fillers. The rubber composition forming the adhesion rubber layer 11 is obtained by blending compounding ingredients into raw rubber material, kneading them to form an unvulcanized rubber composition, and crosslinking the unvulcanized rubber composition using a crosslinker by application of heat and pressure.

The compression rubber layer 12 is formed so that a plurality of V-ribs 13 forming its contact part with a pulley extend inward. The plurality of V-ribs 13 are each formed into a rib of substantially inverted triangular cross section extending in the belt lengthwise direction and are arranged in parallel with each other in the belt widthwise direction. Each V-rib 13 is formed, for example, with a height of 2.0-3.0 mm and a width of 1.0-3.6 mm between its root ends. The number of ribs is 3-6, for example (six in FIG. 1).

The compression rubber layer 12 is made of a rubber composition in which various compounding ingredients are blended into raw rubber material. Examples of the raw rubber material of the rubber composition forming the compression rubber layer 12 include ethylene-α-olefin elastomer rubber, such as ethylene-propylene rubber (EPR) and ethylene-propylene-diene monomer rubber (EPDM), chloroprene rubber (CR), chlorosulfonated polyethylene rubber (CSM), and hydrogenated acrylonitrile-butadiene rubber (H-NBR). Out of them, ethylene-α-olefin elastomer rubber is preferable in terms of its environmental friendliness and performance, such as its abrasion resistance and crack resistance. When the raw rubber material is ethylene-α-olefin elastomer rubber, its friction coefficient, abrasion resistance, and resistance to adhesive wear can be adjusted by using a material showing a high degree of ethylene crystallinity or a material obtained by blending a crystalline polymer with a noncrystalline polymer. Examples of the compounding ingredients include crosslinkers (e.g., sulfur, organic peroxides, etc.), antioxidants, processing aids, plasticizers, reinforcers containing carbon black 18, and short fibers 14. The rubber composition forming the compression rubber layer 12 is obtained by blending compounding ingredients into raw rubber material, kneading them to form an unvulcanized rubber composition, and crosslinking the unvulcanized rubber composition using a crosslinker by application of heat and pressure.

The short fibers 14, which are blended into the rubber composition forming the compression rubber layer 12, are oriented in the belt widthwise direction. Some of the short fibers 14 are scattered and exposed at the contact surface of the belt with a pulley, i.e., at the surfaces of the V-ribs 13. The short fibers 14 exposed at the surfaces of the V-ribs 13 may protrude beyond the surfaces of the V-ribs 13.

The short fibers 14 are manufactured, for example, in the following manner: long fibers subjected to an adhesion treatment of dipping them in an aqueous solution of resorcinol-formaldehyde latex (hereinafter, referred to as an RFL aqueous solution) and then heating them are cut across their lengths into pieces of predetermined length. The short fibers 14 have, for example, a length of 0.2-5.0 mm and a fiber diameter of 10-50 μm.

The amount of the short fibers 14 blended into 100 parts by mass of the rubber material is equal to or less than 30 parts by mass.

The short fibers 14 include short, high modulus fibers made of polymers having an initial tensile resistance, measured according to JIS L 1013, of equal to or greater than 100 cN/dtex and having a main chain which does not contain an aromatic compound.

Examples of the short, high modulus fibers include short polyvinyl alcohol fibers, short polyacetal fibers, short, ultra-high-molecular-weight polyethylene fibers (having a weight-average molecular weight of equal to or greater than one million), short polyketone fibers, short polypropylene fibers, and short, high-strength nylon fibers all satisfying the above conditions.

The short, high modulus fibers preferably have a length of equal to or greater than 0.1 mm, more preferably equal to or greater than 0.3 mm, and still more preferably equal to or greater than 0.5 mm. Furthermore, the short, high modulus fibers preferably have a length of equal to or less than 5 mm, more preferably equal to or less than 3 mm, and still more preferably equal to or less than 1 mm. The short, high modulus fibers preferably have a fiber diameter of 1-50 μM and more preferably 5-40 μm.

The amount of the short, high modulus fibers contained in 100 parts by mass of the raw rubber material is 1-50 parts by mass and more preferably 3-30 parts by mass.

Otherwise, examples of the short fibers 14 may include short cotton fibers, short p-aramid fibers, short m-aramid fibers, short acrylic fibers, short nylon fibers, short polyvinylidene chloride fibers, short polypropylene (PP) fibers, short polyethylene (PE) fibers, short rayon fibers, short polyethylene naphthalate (PEN) fibers, short polyethylene terephthalate (PET) fibers, short polybutylene terephthalate (PBT) fibers, short polytrimethylene terephthalate (PTT) fibers, short polyphenylene sulfide (PPS) fibers, short poly-p-phenylene benzobisoxazole (PBO) fibers, short polybenzimidazole (PBI) fibers, short polyimide (PI) fibers, short polyallylate fibers, short poly-diimidazo-pyridinylene-dihydroxyphenylene (PIPD) fibers, short poly-tetra fluoro ethylene (PTFE) fibers, short polyetheretherketone (PEEK) fibers, and short melamine fibers which all do not satisfy the above conditions.

The carbon black 18 is blended into the rubber composition forming the compression rubber layer 12. The carbon black 18 is partially scattered and exposed at the contact surface with the pulley, i.e., at the surfaces of the V-ribs 13.

The carbon black 18 has, for example, an average particle diameter of 49-500 nm.

The carbon black 18 contains large-particle-diameter carbon black having an iodine absorption, measured according to JIS K 6217-1, of equal to or less than 40 g/Kg, and a specific surface area, measured by nitrogen adsorption according to JIS K 6217-2, of equal to or less than 40 $m^2$/g.

Examples of the above-described large-particle-diameter carbon black includes furnace black, such as FEF-HS, GPF, SRF, SRF-HS, and SRF-LS, and theimal black, such as FT and MT, all satisfying the above conditions.

Although the large-particle-diameter carbon black has an iodine absorption, measured according to JIS K 6217-1, of equal to or less than 40 g/Kg, and/or a specific surface area, measured by nitrogen adsorption according to JIS K 6217-2, of equal to or less than 40 $m^2$/g, it preferably has an iodine absorption of equal to or greater than 3 g/Kg and equal to or less than 35 g/Kg and more preferably equal to or greater than 5 g/Kg and equal to or less than 30 g/Kg. Furthermore, it preferably has a specific surface area, measured by nitrogen adsorption, of equal to or greater than 3 $m^2$/g and equal to or less than 35 $m^2$/g and more preferably equal to or greater than 5 $m^2$/g and equal to or less than 32 $m^2$/g.

The large-particle-diameter carbon black preferably has an average particle diameter of 45-500 nm and more preferably 55-500 nm.

The amount of the large-particle-diameter carbon black contained in 100 parts by mass of the raw rubber material is preferably 20-100 parts by mass and more preferably 40-80 parts by mass.

Otherwise, examples of the carbon black 18 may include SAF, ISAF, and HAF which all do not satisfy the above conditions.

Otherwise, examples of the rubber composition forming the compression rubber layer 12 may include lubricants, such as polytetrafluoroethylene powders, ultra-high-molecular-weight polyethylene powders (having a weight-average molecular weight of equal to or greater than one million), molybdenum disulfide powders, and graphite powders, and fillers, such as calcium carbonate, silica, and aluminum hydroxide, for preventing slips of the belt when the belt is exposed to water.

The adhesion rubber layer 11 and the compression rubber layer 12 may be made of either different rubber compositions or the same rubber composition.

The reinforcement fabric 17 is composed of a woven fabric 17' made of yarns of, e.g., cotton fibers, polyamide fibers, polyester fibers, or aramid fibers, such as by plain weaving, twill weaving, or satin weaving. In order to give the reinforcement fabric 17 an adhesiveness to the V-ribbed belt body 10, the reinforcement fabric 17 is subjected, prior to molding, to an adhesion treatment of dipping it in an RFL aqueous solution and then heating it and/or an adhesion treatment of coating rubber cement on its surface facing the V-ribbed belt body 10 and then drying it. Instead of the reinforcement fabric 17, a rubber composition may be used to form the outer surface of the belt. The reinforcement fabric 17 may be composed of a knit fabric.

The cord 16 is composed of a twisted yarn 16' of fibers, such as polyester fibers (PET), polyethylene naphthalate fibers (PEN), aramid fibers, vinylon fibers, or polyketone fibers. In order to give the cord 16 an adhesiveness to the V-ribbed belt body 10, the cord 16 is subjected, prior to molding, to an adhesion treatment of dipping it in an RFL aqueous solution and then heating it and/or an adhesion treatment of dipping the cord 16 in rubber cement and then drying it.

Since, in recent years, there has been a demand to reduce the size of an engine compartment, serpentine accessory drive belt transmission systems having a single V-ribbed belt wrapped around three or more pulleys including a crankshaft pulley (drive ribbed pulley), a power steering pulley, an air-conditioner pulley, etc. (driven ribbed pulleys), have been widely used as automotive accessory drive belt transmission systems. However, with increasing functionality of an automobile, the number of components contained in an engine compartment increases. Therefore, also in a layout of pulleys of an accessory drive belt transmission system, for example, the span length between a pair of adjacent pulleys around which a V-ribbed belt is wrapped must be reduced. Alternatively, the alignment tolerance between the pulleys must be increased. Due to such limitations, the amount of misalignment between a pair of adjacent ribbed pulleys of an accessory drive belt transmission system around which a V-ribbed belt is wrapped is increased. As a result, noises arising from the misalignment are more frequently generated.

However, according to the V-ribbed belt B configured as described above, specific, short, high modulus fibers and large-particle-diameter carbon black are combined into the short fibers 14 and the carbon black 18, respectively, which are both scattered so as to be exposed at the surfaces of the V-ribs 13. This can provide an excellent noise reduction effect during the belt run. This effect cannot be achieved when only either the short, high modulus fibers or the large-particle-diameter carbon black are combined into corresponding ones of the short fibers 14 and the carbon black 18.

Specifically, for example, even when the amount of misalignment between the pair of the adjacent ribbed pulleys of the belt transmission system around which the V-ribbed belt B is wrapped is great, generation of noise arising from the misalignment can be significantly reduced. Furthermore, noise generation can be very significantly reduced, for example, even under conditions of use where water exists between the pulleys.

In addition, the above-described rubber composition of the compression rubber layer 12 provides the following advantages: the friction coefficient of the belt hardly varies with an increase in the time during which the belt runs; moreover, the degree of the adhesive wear is small; the abrasion resistance of the belt is great; and furthermore the amount of heat generated in the compression rubber layer 12 during the belt run is small. These advantages make it difficult to cause separation of the cord 16 from the surrounding component (cord separation) due to a heat-induced reduction in the adhesion of the cord 16. Therefore, power can be stably transmitted.

Figure 2:
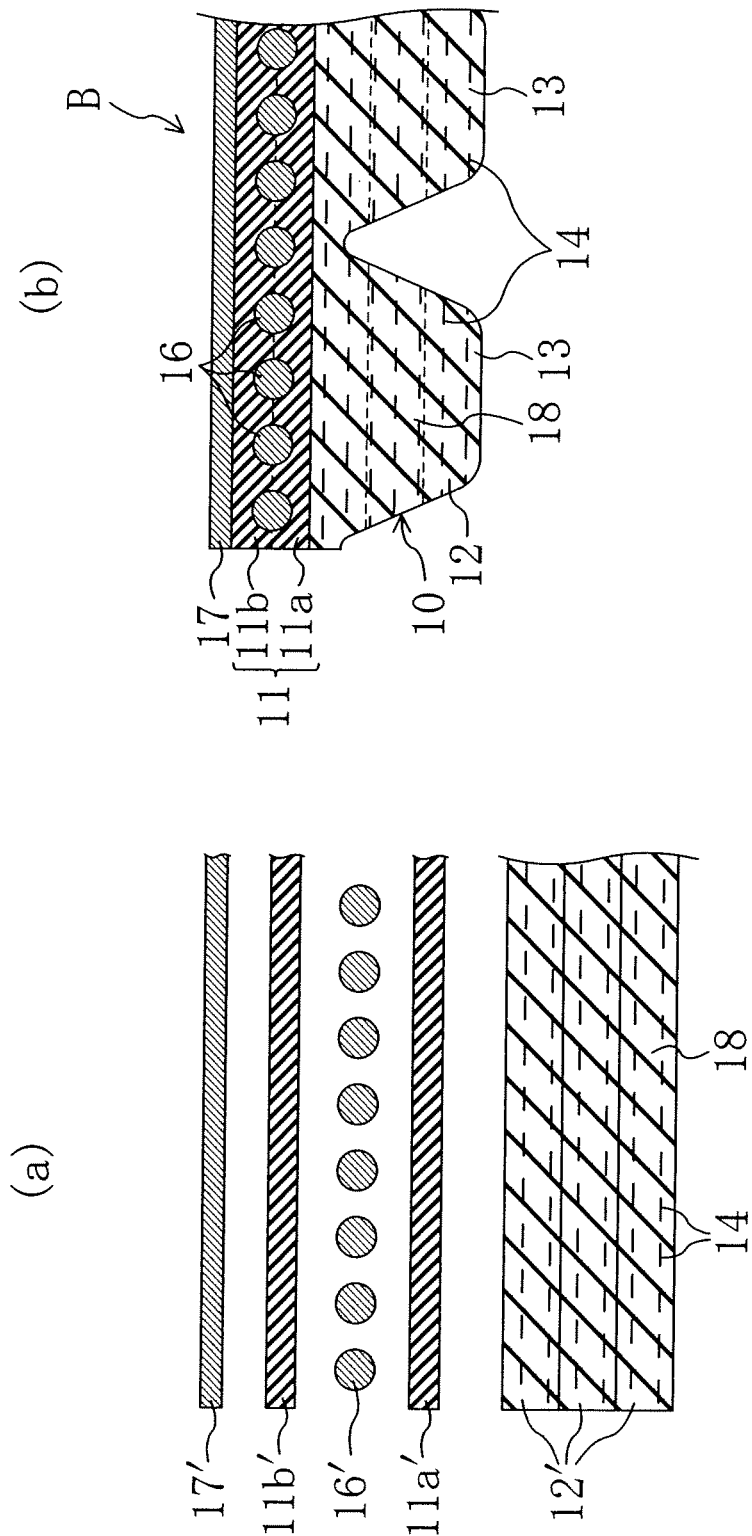
[FIG. 2]

Next, a method for fabricating the V-ribbed belt B will be described with reference to FIG. 2.

In fabricating a V-ribbed belt B, an inner mold having a molding surface for forming the belt back face into a predetermined shape and a rubber sleeve having a molding surface for forming a compression rubber layer of the belt into a predetermined shape are used for the outer and inner peripheries, respectively, of the V-ribbed belt B.

The outer periphery of the inner mold is first covered with a woven fabric 17' serving as a reinforcement fabric 17, and an unvulcanized rubber sheet 11b' for forming an outside part 11b of an adhesion rubber layer 11 is then wrapped around the reinforcement fabric 17.

Subsequently, a twisted yarn 16' serving as a cord 16 is wrapped in a spiral form around the unvulcanized rubber sheet 11b', another unvulcanized rubber sheet 11a' for forming an inside part 11a of the adhesion rubber layer 11 is then wrapped around the cord-wrapped unvulcanized rubber sheet 11b', and still another unvulcanized rubber sheet 12' for forming a compression rubber layer 12 is then wrapped around the unvulcanized rubber sheet 11a'. In this case, a material used as the unvulcanized rubber sheet 12' for forming the compression rubber layer 12 is a rubber composition in which short fibers 14 oriented in the direction orthogonal to the wrapping direction are blended. This unvulcanized rubber sheet 12' is obtained by blending 50 or less parts by mass of the short fibers 14 into 100 parts by mass of raw rubber material. Out of the short fibers 14 blended into 100 parts by mass of raw rubber material, 1 or more parts by mass of the short fibers have an initial tensile resistance, measured according to JIS L 1013, of equal to or greater than 100 cN/dtex.

Thereafter, the rubber sleeve is fitted onto the molding article on the inner mold, and they are placed into a molding pan. Then, the inner mold is heated as by hot steam, and a high pressure is applied to the rubber sleeve to press it radially inwardly. During the time, the raw rubber material fluidizes, a crosslinking reaction proceeds, and furthermore, adhesion reactions of the twisted yarn 16' and the woven fabric 17' to the rubber also proceed. Thus, a cylindrical belt slab (belt body preform) is molded.

Then, the belt slab is removed from the inner mold and separated at different locations of its length into several pieces, and the outer periphery of each separated piece is ground by an abrasive wheel to form V-ribs 13, i.e., a contact part of the belt with a pulley. In this case, the short fibers 14 exposed at the contact surface of the belt with the pulley may protrude beyond the contact surface of the belt with the pulley, i.e., the surfaces of the V-ribs 13. Since the specific, short, high modulus fibers and the large-particle-diameter carbon black are combined into the rubber composition to be ground, the amount of heat generated by friction is small. Therefore, the period during which the abrasive wheel can be used is longer than ever before.

Finally, the separated belt slab piece having V-ribs 13 formed on the outer periphery is sliced into pieces of predetermined width, and each sliced piece is turned inside out to provide a V-ribbed belt B.

Next, an accessory drive belt transmission system 30 using the V-ribbed belt B and provided in an automotive engine compartment will be described.

Figure 3:
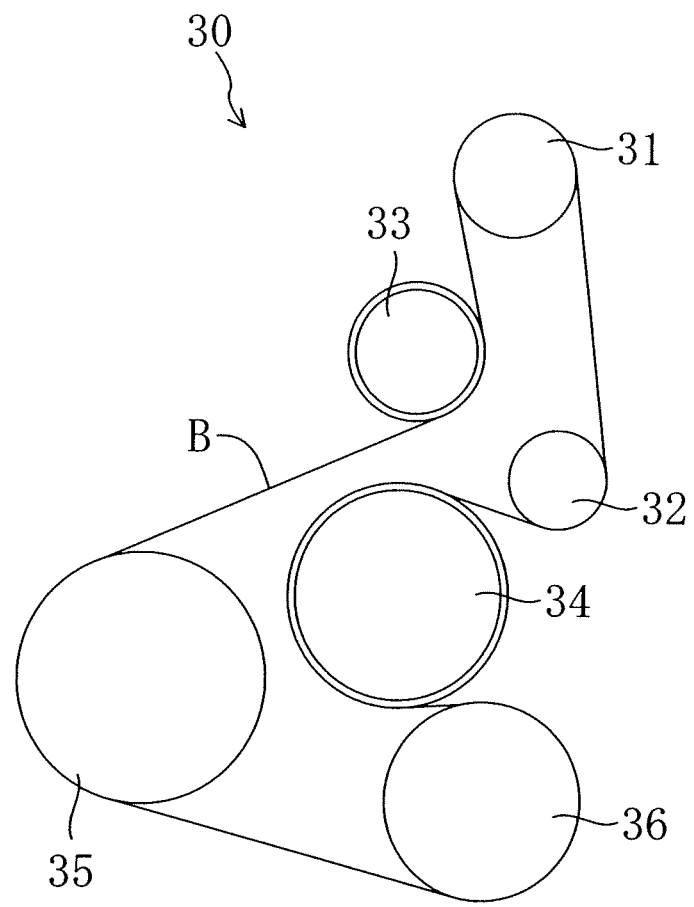
[FIG. 3]

FIG. 3 illustrates a layout of pulleys in the accessory drive belt transmission system 30. This accessory drive belt transmission system 30 is a serpentine accessory drive belt transmission system having the V-ribbed belt B wrapped around six pulleys, i.e., four ribbed pulleys and two flat pulleys.

The layout of the accessory drive belt transmission system 30 includes an uppermost power steering pulley 31, an AC generator pulley 32 disposed below the power steering pulley 31, a flat tensioner pulley 33 disposed downward and leftward from the power steering pulley 31, a flat water pump pulley 34 disposed below the tensioner pulley 33, a crankshaft pulley 35 disposed downward and leftward from the tensioner pulley 33, and an air-conditioner pulley 36 disposed downward and rightward from the crankshaft pulley 35. Out of these pulleys, all the pulleys other than the tensioner pulley 33 and the water pump pulley 34, which are flat pulleys, are ribbed pulleys. The V-ribbed belt B is arranged by being wrapped around the power steering pulley 31 to allow its V-ribs 13 to come into contact with the power steering pulley 31, then wrapped around the tensioner pulley 33 to allow its back face to come into contact with the tensioner pulley 33, then sequentially wrapped around the crankshaft pulley 35 and the air-conditioner pulley 36 to allow its V-ribs 13 to come into contact with these pulleys, then wrapped around the water pump pulley 34 to allow its back face to come into contact with the water pump pulley 34, then wrapped around the AC generator pulley 32 to allow its V-ribs 13 to come into contact with the AC generator pulley 32, and then returned to the power steering pulley 31.

For the accessory drive belt transmission system 30 configured as described above, the use of the V-ribbed belt B can reduce noise arising from misalignment, in particular, even in the following cases: when the accessory drive belt transmission system 30 includes a pair of adjacent pulleys between which any significant misalignment tends to be caused when the belt span length therebetween is equal to or less than 90 mm, around which the V-ribbed belt B is wrapped, and at least one of which is a ribbed pulley; and alternatively when the accessory drive belt transmission system 30 includes a pair of adjacent pulleys the actual amount of misalignment between which is greater than 2.70°, around which the V-ribbed belt B is wrapped, and at least one of which is a ribbed pulley.

Here, the belt span length means the distance between the tangent points on the common tangent of the pair of adjacent pulleys around which the V-ribbed belt B is wrapped (The Society of Belt Transmission Engineers, ed., Practical Design for Belt Drives/Precise Transfer New Edition (in Japanese), p. 39, Yokendo).

Figure 4:
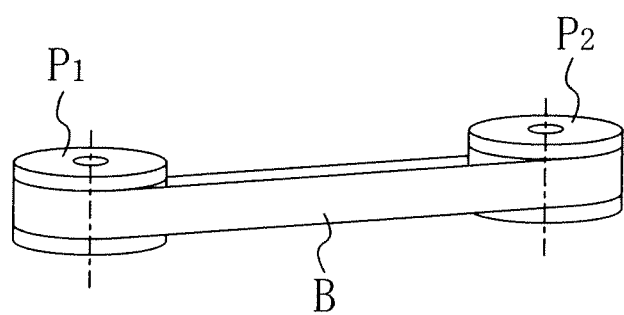
[FIG. 4]
Figure 6:
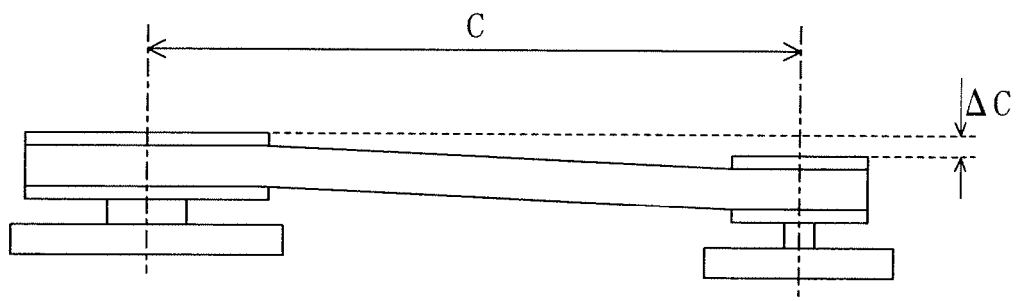
[FIG. 6]

Furthermore, misalignment is caused due to the following causes: displacement of one of a pair of ribbed pulleys P1 and P2 with respect to the other pulley as illustrated in FIG. 4; or inclination of one of the pulleys as illustrated in FIGS. 5(a) and 5(b). The amount a of misalignment between a pair of pulleys is determined using the following equation:

$$\alpha = \tan^{-1}(\Delta C/C)$$

where, as illustrated in FIG. 6, while the V-ribbed belt B is wrapped around the ribbed pulleys P1 and P2, and a predetermined magnitude of axial loading is applied to the pulleys, the distance C between the respective axes of the ribbed pulleys P1 and P2 is measured, and an axial displacement ΔC of one of the pair of the ribbed pulleys, i.e., the ribbed pulley P2, with respect to the other pulley P1 at the locations of their axes is measured (The Society of Belt Transmission Engineers, ed., Practical Design for Belt Drives/Precise Transfer—New Edition (in Japanese), p. 64-65, Yokendo).

Although, in this embodiment, the entire compression rubber layer 12 is made of a single rubber composition, it is not particularly limited to this composition. At least the contact part of the surfaces of the V-ribs 13 with the pulley only needs to be made of the above-described rubber composition.

Furthermore, although, in this embodiment, short, high modulus fibers are blended into the rubber composition forming the compression rubber layer, they are not particularly limited to this composition. Short, high modulus fibers may be adhered to the surfaces of the V-ribs 13 either before or after the belt molding.

Moreover, although, in this embodiment, the accessory drive belt transmission system 30 includes four ribbed pulleys, the number of ribbed pulleys is not particularly limited to four as long as the accessory drive belt transmission system 30 includes three or more pulleys including a pair of ribbed pulleys. The accessory drive belt transmission system 30 may include more ribbed pulleys.

[Test Evaluation]

Test evaluations conducted on V-ribbed belts will be described.

(Belts for Test Evaluation)

The following Principal Formulations 1-10 were used as rubber compositions forming compression rubbers of V-ribbed belts for test evaluations. The details of the formulations are also illustrated in Table 1.

—Principal Formulation 1—

EPDM (ethylene-propylene-diene monomer rubber) (1) (Product Name: EP43, made by JSR Corporation) was used as a rubber material, and the following rubber formulation was used as Principal Formulation 1: the rubber formulation was obtained by blending 15 parts by mass of paraffin base oil (Product Name: SUNPAR 2280, made by Japan Sun Oil Company, Ltd.), 5 parts by mass of zinc oxide (Product Name: Aenka #3, made by Sakai Chemical Industry Co., Ltd.), 1 part by mass of stearic acid (Product Name: STEARIC ACID 50S, made by New Japan Chemical co., ltd.), 0.5 parts by mass of antioxidant (1) (Product Name: NOCRAC 224, made by OUCHI SHINKO CHEMICAL INDUSTRIAL CO., LTD.), 1.5 parts by mass of antioxidant (2) (Product Name: NOCRAC MB, made by OUCHI SHINKO CHEMICAL INDUSTRIAL CO., LTD.), 8 parts by mass of organic peroxide (Product Name: PERCUMYL D-40, made by NOF CORPORATION), and 0.2 parts by mass of sulfur (Product Name: OIL SULFUR, made by Tsurumi Chemical Industry Co., Ltd.) into 100 parts by mass of the rubber material and blending a predetermined amount of predetermined carbon black and a predetermined amount of predetermined short fibers into the resultant composition.

—Principal Formulation 2—

EPDM (2) (Product Name: EP24, made by JSR Corporation) was used as a rubber material, and the following rubber formulation was used as Principal Formulation 2: the rubber formulation was obtained by blending 15 parts by mass of paraffin base oil, 5 parts by mass of zinc oxide, 1 part by mass of stearic acid, 2 parts by mass of antioxidant (1), 2 parts by mass of sulfur, and 4 parts by mass of rubber accelerator (1) (Product Name: NOCCELER MSA, made by OUCHI SHINKO CHEMICAL INDUSTRIAL CO., LTD.) into 100 parts by mass of the rubber material and blending a predetermined amount of predetermined carbon black and a predetermined amount of predetermined short fibers into the resultant composition.

—Principal Formulation 3—

EOM (ethylene-octene monomer rubber) (Product Name: Engage 8180, made by The Dow Chemical Company) was used as a rubber material, and the following rubber formulation was used as Principal Formulation 3: the rubber formulation was obtained by blending 15 parts by mass of paraffin base oil, 5 parts by mass of zinc oxide, 1 part by mass of stearic acid, 0.5 parts by mass of antioxidant (1), 1.5 parts by mass of antioxidant (2), 8 parts by mass of organic peroxide, and 0.2 parts by mass of sulfur into 100 parts by mass of the rubber material and blending a predetermined amount of predetermined carbon black and a predetermined amount of predetermined short fibers into the resultant composition.

—Principal Formulation 4—

EBM (ethylene-butene monomer rubber) (Product Name: Engage 7447, made by The Dow Chemical Company) was used as a rubber material, and the following rubber formulation was used as Principal Formulation 4: the rubber formulation was obtained by blending 15 parts by mass of paraffin base oil, 5 parts by mass of zinc oxide, 1 part by mass of stearic acid, 0.5 parts by mass of antioxidant (1), 1.5 parts by mass of antioxidant (2), 8 parts by mass of organic peroxide, and 0.2 parts by mass of sulfur into 100 parts by mass of the rubber material and blending a predetermined amount of predetermined carbon black and a predetermined amount of predetermined short fibers into the resultant composition.

—Principal Formulation 5—

NR (natural rubber) (Product Name: RSS3, made by Vee Rubber) was used as a rubber material, and the following rubber formulation was used as Principal Formulation 5: the rubber formulation was obtained by blending 10 parts by mass of aromatic oil (Product Name: AROMAX BK, made by KOBE OIL CHEMICAL INDUSTRIAL Co., Ltd.), 5 parts by mass of zinc oxide, 1 part by mass of stearic acid, 1 part by mass of antioxidant (1), 0.5 parts by mass of sulfur, 0.5 parts by mass of rubber accelerator (2) (Product Name: NOCCELER TT, made by OUCHI SHINKO CHEMICAL INDUSTRIAL CO., LTD.), and 1.5 parts by mass of rubber accelerator (3) (Product Name: NOCCELER D, made by OUCHI SHINKO CHEMICAL INDUSTRIAL CO., LTD.) into 100 parts by mass of the rubber material and blending a predetermined amount of predetermined carbon black and a predetermined amount of predetermined short fibers into the resultant composition.

—Principal Formulation 6—

BR (butadiene rubber) (Product Name: BR01, made by JSR Corporation) was used as a rubber material, and the following rubber formulation was used as Principal Formulation 6: the rubber formulation was obtained by blending 10 parts by mass of aromatic oil, 5 parts by mass of zinc oxide, 1 part by mass of stearic acid, 1 part by mass of antioxidant (1), 0.5 parts by mass of sulfur, 0.5 parts by mass of rubber accelerator (2), and 1.5 parts by mass of rubber accelerator (3) into 100 parts by mass of the rubber material and blending a predetermined amount of predetermined carbon black and a predetermined amount of predetermined short fibers into the resultant composition.

—Principal Formulation 7—

CR (chloroprene rubber) (Product Name: Shoprene GS, made by Showa Neoprene Industries, Ltd.) was used as a rubber material, and the following rubber formulation was used as Principal Formulation 7: the rubber formulation was obtained by blending 5 parts by mass of aromatic oil, 5 parts by mass of zinc oxide, 4 parts by mass of magnesium oxide (Product Name: KYOMAG 150, made by Kyowa Chemical Industry Co., Ltd.), and 1 part by mass of stearic acid into 100 parts by mass of the rubber material and blending a predetermined amount of predetermined carbon black and a predetermined amount of predetermined short fibers into the resultant composition.

—Principal Formulation 8—

ACSM (alkylated chlorosulfonated polyethylene rubber) (Product Name: EXTOS ET-8010, made by Tosoh Corporation) was used as a rubber material, and the following rubber formulation was used as Principal Formulation 8: the rubber formulation was obtained by blending 10 parts by mass of plasticizer (Product Name: Adekasizer RS107, made by ADEKA Corporation), 5 parts by mass of zinc oxide, 1 part by mass of stearic acid, and 8 parts by mass of organic peroxide into 100 parts by mass of the rubber material and blending a predetermined amount of predetermined carbon black and a predetermined amount of predetermined short fibers into the resultant composition.

—Principal Formulation 9—

NBR (nitrile rubber) (Product Name: Nipol 1041, made by ZEON CORPORATION) was used as a rubber material, and the following rubber formulation was used as Principal Formulation 9: the rubber formulation was obtained by blending 10 parts by mass of plasticizer, 5 parts by mass of zinc oxide, 1 part by mass of stearic acid, 1.5 parts by mass of antioxidant (1), 0.5 parts by mass of sulfur, 0.5 parts by mass of rubber accelerator (2), and 1.5 parts by mass of rubber accelerator (3) into 100 parts by mass of the rubber material and blending a predetermined amount of predetermined carbon black and a predetermined amount of predetermined short fibers into the resultant composition.

—Principal Formulation 10—

H-NBR (hydrogenated nitrile rubber) (Product Name: Zetpol 2020, made by ZEON CORPORATION) was used as a rubber material, and the following rubber formulation was used as Principal Formulation 10: the rubber formulation was obtained by blending 10 parts by mass of plasticizer, 5 parts by mass of zinc oxide, 1 part by mass of stearic acid, and 8 parts by mass of organic peroxide into 100 parts by mass of the rubber material and blending a predetermined amount of predetermined carbon black and a predetermined amount of predetermined short fibers into the resultant composition.

TABLE 1

| | | Principal Formulation 1 | Principal Formulation 2 | Principal Formulation 3 | Principal Formulation 4 |
|---|---|---|---|---|---|
| EPDM (1) | EP43 made by JSR Corporation | 100 | | | |
| EPDM (2) | EP24 made by JSR Corporation | | 100 | | |
| EOM | Engage 8180 made by The Dow Chemical Company | | | 100 | |
| EBM | Engage 7447 made by The Dow Chemical Company | | | | 100 |
| NR | RSS3 made by Vee Rubber | | | | |
| BR | BR01 made by JSR Corporation | | | | |
| CR | Shoprene GS, made by Showa Neoprene Industries, Ltd. | | | | |
| ACSM | EXTOS ET-8010 made by Tosoh Corporation | | | | |
| NBR | Nipol 1041 made by ZEON CORPORATION | | | | |
| HNBR | Zetpol 2020 made by ZEON CORPORATION | | | | |
| Carbon Blacks | | Various Variables | Various Variables | Various Variables | Various Variables |
| Paraffin Base Oil | SUNPAR 2280 made by Japan Sun Oil Company, Ltd. | 15 | 15 | 15 | 15 |
| Aromatic Oil | AROMAX BK, made by KOBE OIL CHEMICAL INDUSTRIAL Co., Ltd. | | | | |
| Plasticizer | Adekasizer RS107 made by ADEKA Corporation | | | | |
| Zinc Oxide | Zinc Oxide #3 made by Sakai Chemical Industry Co., Ltd. | 5 | 5 | 5 | 5 |
| Magnesium Oxide | KYOMAG 150, made by Kyowa Chemical Industry Co., Ltd. | | | | |
| Stearic Acid | STEARIC ACID 50S made by New Japan Chemical co., ltd. | 1 | 1 | 1 | 1 |
| Antioxidant (1) | NOCRAC 224 made by OUCHI SHINKO CHEMICAL INDUSTRIAL CO., LTD. | 0.5 | 2 | 0.5 | 0.5 |
| Antioxidant (2) | NOCRAC MB, made by OUCHI SHINKO CHEMICAL INDUSTRIAL CO., LTD. | 1.5 | | 1.5 | 1.5 |
| Organic Peroxide | PERCUMYL D-40 made by NOF CORPORATION | 8 | | 8 | 8 |
| Sulfur | OIL SULFUR, made by Tsurumi Chemical Industry Co., Ltd. | 0.2 | 2 | 0.2 | 0.2 |
| Rubber Accelerator (1) | NOCCELER MSA, made by OUCHI SHINKO CHEMICAL INDUSTRIAL CO., LTD. | | 4 | | |
| Rubber Accelerator (2) | NOCCELER TT, made by OUCHI SHINKO CHEMICAL INDUSTRIAL CO., LTD. | | | | |
| Rubber Accelerator (3) | NOCCELER D, made by OUCHI SHINKO CHEMICAL INDUSTRIAL CO., LTD. | | | | |
| Short Fibers | | Various Variables | Various Variables | Various Variables | Various Variables |

| | Principal Formulation 5 | Principal Formulation 6 | Principal Formulation 7 | Principal Formulation 8 | Principal Formulation 9 | Principal Formulation 10 |
|---|---|---|---|---|---|---|
| EPDM (1) | | | | | | |
| EPDM (2) | | | | | | |
| EOM | | | | | | |
| EBM | | | | | | |
| NR | 100 | | | | | |
| BR | | 100 | | | | |

TABLE 1-continued

| | | | | | | |
|---|---|---|---|---|---|---|
| CR | | | 100 | | | |
| ACSM | | | | 100 | | |
| NBR | | | | | 100 | |
| HNBR | | | | | | 100 |
| Carbon Blacks | Various Variables | Various Variables | Various Variables | Various Variables | Various Variables | Various Variables |
| Paraffin Base Oil | | | | | | |
| Aromatic Oil | 10 | 10 | 5 | | | |
| Plasticizer | | | | 10 | 10 | 10 |
| Zinc Oxide | 5 | 5 | 5 | 5 | 5 | 5 |
| Magnesium Oxide | | | 4 | | | |
| Stearic Acid | 1 | 1 | 1 | 1 | 1 | 1 |
| Antioxidant (1) | 1 | 1 | | | 1.5 | |
| Antioxidant (2) | | | | | | |
| Organic Peroxide | | | | 8 | | 8 |
| Sulfur | 0.5 | 0.5 | | | 0.5 | |
| Rubber Accelerator (1) | | | | | | |
| Rubber Accelerator (2) | 0.5 | 0.5 | | | 0.5 | |
| Rubber Accelerator (3) | 1.5 | 1.5 | | | 1.5 | |
| Short Fibers | Various Variables | Various Variables | Various Variables | Various Variables | Various Variables | Various Variables |

EXAMPLE 1

As Example 1, a V-ribbed belt was fabricated in which a compression rubber layer was formed using an uncrosslinked rubber composition obtained by blending the ingredients in Principal Formulation 1 in which 60 parts by mass of carbon black GPF (Product Name: Seast V, Iodine Absorption: 26 g/Kg, Specific Surface Area Measured By Nitrogen Adsorption: 27 m$^2$/g, Average Particle Diameter: 62 nm, made by Tokai Carbon Co., Ltd.) and 10 parts by mass of short vinylon fibers (Product Name: HM1, Initial Tensile Resistance: 215 cN/dtex, Fiber Length: 1 mm, Aromatic Compound in Main Chain: None, made by Unitika Ltd.) were used as the carbon black and the short fibers, respectively, and kneading the ingredients in Principal Formulation 1.

The adhesion rubber layer, the reinforcement fabric and the cord are composed of a rubber composition using EPDM, woven fabric made of nylon fibers, and a twisted yarn made of polyethylene naphthalate fibers (PEN), respectively. The belt length was 1210 mm, the belt width was 21.4 mm, and the belt thickness was 4.3 mm. The number of ribs was six.

EXAMPLE 2

As Example 2, a V-ribbed belt was fabricated in which a compression rubber layer was formed using an uncrosslinked rubber composition obtained by blending the ingredients in Principal Formulation 1 in which 65 parts by mass of carbon black SRF (Product Name: Seast S, Iodine Absorption: 26 g/Kg, Specific Surface Area Measured By Nitrogen Adsorption: 27 m$^2$/g, Average Particle Diameter: 66 nm, made by Tokai Carbon Co., Ltd.) and 10 parts by mass of short vinylon fibers were used as the carbon black and the short fibers, respectively, and kneading the ingredients in Principal Formulation 1.

The other structures of the adhesion rubber layer, etc., are identical with those of Example 1.

EXAMPLE 3

As Example 3, a V-ribbed belt was fabricated in which a compression rubber layer was formed using an uncrosslinked rubber composition obtained by blending the ingredients in Principal Formulation 1 in which 80 parts by mass of carbon black MT (Product Name: N-990, Iodine Absorption: 8.7 g/Kg, made by Degussa Engineered Carbons, LP) and 10 parts by mass of short vinylon fibers were used as the carbon black and the short fibers, respectively, and kneading the ingredients in Principal Formulation 1.

The other structures of the adhesion rubber layer, etc., are identical with those of Example 1.

EXAMPLE 4

As Example 4, a V-ribbed belt was fabricated with the same configuration as Example 1 except that a compression rubber layer was formed using an uncrosslinked rubber composition in which the amount of the blended short vinylon fibers was 18 parts by mass and which was obtained by kneading the blended ingredients.

EXAMPLE 5

As Example 5, a V-ribbed belt was fabricated with the same configuration as Example 1 except that a compression rubber layer was formed using an uncrosslinked rubber composition in which the amount of the blended short vinylon fibers was 16 parts by mass, into which 4 parts by mass of short nylon fibers (Product Name: Leona 66, Initial Tensile Resistance: 44 cN/dtex, Fiber Length: 1 mm, Aromatic Compound in Main Chain: None, made by Asahi Kasei Corporation) was further blended, and which was obtained by kneading the blended ingredients.

EXAMPLE 6

As Example 6, a V-ribbed belt was fabricated with the same configuration as Example 5 except that a compression rubber layer was formed using an uncrosslinked rubber composition in which the amount of the blended short vinylon fibers was 10 parts by mass and the amount of the blended short nylon fibers was 16 parts by mass, and which was obtained by kneading the blended ingredients.

EXAMPLE 7

As Example 7, a V-ribbed belt was fabricated with the same configuration as Example 6 except that a compression rubber layer was formed using an uncrosslinked rubber composition into which 10 parts by mass of ultra-high-molecular-weight polyethylene powders (Product Name: HIZEX MILLION 240S, made by Mitsui Chemicals, Inc.) were further blended and which was obtained by kneading the blended ingredients.

EXAMPLES 8-16

As Examples 8-16, V-ribbed belts were fabricated in each of which a compression rubber layer was formed using an uncrosslinked rubber composition obtained by blending the ingredients in a corresponding one of Principal Formulations 2-10 in which 60 parts by mass of carbon black GPF were used as the carbon black and 10 parts by mass of short vinylon fibers and 16 parts by mass of short nylon fibers were used as the short fibers, and kneading the blended ingredients in the corresponding one of Principal Formulations 2-10. Examples 8-16 correspond to Principal Formulations 2-10, respectively.

The adhesion rubber layer, the reinforcement fabric and the cord were composed of a rubber composition using EPDM, woven fabric made of nylon fibers, and a twisted yarn made of polyethylene naphthalate fibers (PEN), respectively. The belt length was 1210 mm, the belt width was 21.4 mm, and the belt thickness was 4.3 mm. The number of ribs was six.

EXAMPLE 17

As Example 17, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of polyacetal fibers (Product Name: Tenac SD, Initial Tensile Resistance: 141 cN/dtex, Fiber Length: 1 mm, Aromatic Compound in Main Chain: None, made by Asahi Kasei Corporation) were used as the carbon black and the short fibers, respectively, and kneading the blended ingredients in Principal Formulation 1.

The other structures of the adhesion rubber layer, etc., are identical with those of Example 1.

EXAMPLE 18

As Example 18, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of polypropylene fibers (1) (Product Name: Simtex HM, Initial Tensile Resistance: 100-140 cN/dtex, Fiber Length: 1 mm, Aromatic Compound in Main Chain: None, made by UBE-NITTO KASEI CO., LTD.) were used as the carbon black and the short fibers, respectively, and kneading the blended ingredients in Principal Formulation 1.

The other structures of the adhesion rubber layer, etc., are identical with those of Example 1.

COMPARATIVE EXAMPLE 1

As Comparative Example 1, a V-ribbed belt was fabricated in which a compression rubber layer was formed using an uncrosslinked rubber composition obtained by blending the ingredients in Principal Formulation 1 in which 50 parts by mass of carbon black FEF (Product Name: Seast SO, Iodine Absorption: 44 g/Kg, Specific Surface Area Measured By Nitrogen Adsorption: 42 m$^2$/g, Average Particle Diameter: 43 nm, made by Tokai Carbon Co., Ltd.) and 18 parts by mass of short vinylon fibers were used as the carbon black and the short fibers, respectively, and kneading the blended ingredients. The specification of the V-ribbed belt in this comparative example corresponds to that of a V-ribbed belt in PATENT DOCUMENT 3.

The other structures of the adhesion rubber layer, etc., are identical with those of Example 1.

COMPARATIVE EXAMPLE 2

As Comparative Example 2, a V-ribbed belt was fabricated with the same configuration as Comparative Example 1 except that a compression rubber layer was formed using an uncrosslinked rubber composition in which the amount of the blended short vinylon fibers was 16 parts by mass, into which 4 parts by mass of short nylon fibers were further blended, and which was obtained by kneading the blended ingredients. The specification of this V-ribbed belt also corresponds to that of the V-ribbed belt in PATENT DOCUMENT 3.

COMPARATIVE EXAMPLE 3

As Comparative Example 3, a V-ribbed belt was fabricated with the same configuration as Comparative Example 1 except that a compression rubber layer was formed using an uncrosslinked rubber composition in which the amount of the blended short vinylon fibers and the amount of the blended short nylon fibers were 10 parts by mass and 16 parts by mass, respectively, and which was obtained by kneading the blended ingredients. The specification of this V-ribbed belt also corresponds to that of the V-ribbed belt in PATENT DOCUMENT 3.

COMPARATIVE EXAMPLE 4

As Comparative Example 4, a V-ribbed belt was fabricated in which a compression rubber layer was formed using an uncrosslinked rubber composition obtained by blending the ingredients in Principal Formulation 1 in which 20 parts by mass of carbon black HAF (Product Name: Seast 3, Iodine Absorption: 80 g/Kg, Specific Surface Area Measured By Nitrogen Adsorption: 79 m$^2$/g, Average Particle Diameter: 28 nm, made by Tokai Carbon Co., Ltd.) and 55 parts by mass of carbon black GPF were used as the carbon black and 25 parts by mass of short nylon fibers were used as the short fibers, and kneading the blended ingredients. The specification of the V-ribbed belt in this comparative example corresponds to that of a V-ribbed belt in PATENT DOCUMENT 1.

The other structures of the adhesion rubber layer, etc., are identical with those of Example 1.

COMPARATIVE EXAMPLE 5

As Comparative Example 5, a V-ribbed belt was fabricated with the same configuration as Comparative Example 4 except that a compression rubber layer was formed using an uncrosslinked rubber composition in which the amount of the blended carbon black HAF and the amount of the blended carbon black GPF were 60 parts by mass and 15 parts by mass, respectively, and which was obtained by kneading the blended ingredients. The specification of this V-ribbed belt also corresponds to that of the V-ribbed belt in PATENT DOCUMENT 1.

COMPARATIVE EXAMPLE 6

As Comparative Example 6, a V-ribbed belt was fabricated in which a compression rubber layer was formed using an uncrosslinked rubber composition obtained by blending the ingredients in Principal Formulation 1 in which 20 parts by mass of carbon black ISAF (Product Name: Seast 6, Iodine Absorption: 121 g/Kg, Specific Surface Area Measured By Nitrogen Adsorption: 119 m²/g, Average Particle Diameter: 22 nm, made by Tokai Carbon Co., Ltd.) and 50 parts by mass of carbon black GPF were used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 7

As Comparative Example 7, a V-ribbed belt was fabricated with the same configuration as Comparative Example 6 except that a compression rubber layer was formed using an uncrosslinked rubber composition in which the amount of the blended carbon black ISAF and the amount of the blended carbon black GPF were 55 parts by mass and 15 parts by mass, respectively, and which was obtained by kneading the blended ingredients. The specification of this V-ribbed belt also corresponds to that of the V-ribbed belt in PATENT DOCUMENT 1.

COMPARATIVE EXAMPLE 8

As Comparative Example 8, a V-ribbed belt was fabricated in which a compression rubber layer was formed using an uncrosslinked rubber composition obtained by blending the ingredients in Principal Formulation 1 in which 20 parts by mass of carbon black ISAF and 50 parts by mass of carbon black SRF are used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 9

As Comparative Example 9, a V-ribbed belt was fabricated with the same configuration as Comparative Example 8 except that a compression rubber layer was formed using an uncrosslinked rubber composition in which the amount of the blended carbon black ISAF and the amount of the blended carbon black SRF were 50 parts by mass and 15 parts by mass, respectively, and which was obtained by kneading the blended ingredients. The specification of this V-ribbed belt also corresponds to that of the V-ribbed belt in PATENT DOCUMENT 1.

COMPARATIVE EXAMPLE 10

As Comparative Example 10, a V-ribbed belt was fabricated in which a compression rubber layer was formed using an uncrosslinked rubber composition obtained by blending the ingredients in Principal Formulation 1 in which 20 parts by mass of carbon black HAF and 55 parts by mass of carbon black SRF were used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 11

As Comparative Example 11, a V-ribbed belt was fabricated with the same configuration as Comparative Example 10 except that a compression rubber layer was formed using an uncrosslinked rubber composition in which the amount of the blended carbon black HAF and the amount of the blended carbon black SRF were 60 parts by mass and 15 parts by mass, respectively, and which was obtained by kneading the blended ingredients. The specification of this V-ribbed belt also corresponds to that of the V-ribbed belt in PATENT DOCUMENT 1.

COMPARATIVE EXAMPLE 12

As Comparative Example 12, a V-ribbed belt was fabricated in which a compression rubber layer was formed using an uncrosslinked rubber composition obtained by blending the ingredients in Principal Formulation 1 in which 45 parts by mass of carbon black HAF and 30 parts by mass of carbon black GPF were used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 13

As Comparative Example 13, a V-ribbed belt was fabricated in which a compression rubber layer was formed using an uncrosslinked rubber composition obtained by blending the ingredients in Principal Formulation 1 in which 60 parts by mass of carbon black GPF and 25 parts by mass of short nylon fibers were used as the carbon black and the short fibers, respectively, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 14

As Comparative Example 14, a V-ribbed belt was fabricated in which a compression rubber layer was formed using an uncrosslinked rubber composition obtained by blending the ingredients in Principal Formulation 1 in which 15 parts by mass of carbon black HAF and 60 parts by mass of carbon black GPF were used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLE 15

As Comparative Example 15, a V-ribbed belt was fabricated in which a compression rubber layer is formed using an uncrosslinked rubber composition obtained by blending the ingredients in Principal Formulation 1 in which 55 parts by mass of carbon black GPF and 15 parts by mass of carbon black SRF were used as the carbon black and 25 parts by mass of short nylon fibers were used as the short fibers, and kneading the blended ingredients. The specification of the V-ribbed belt in this comparative example also corresponds to that of a V-ribbed belt in PATENT DOCUMENT 1.

The other structures of the adhesion rubber layer, etc., are identical with those of Example 1.

COMPARATIVE EXAMPLES 16-24

As Comparative Examples 16-24, V-ribbed belts were fabricated in each of which a compression rubber layer was formed using an uncrosslinked rubber composition obtained by blending the ingredients in a corresponding one of Principal Formulations 2-10 in which 50 parts by mass of carbon black FEF were used as the carbon black and 10 parts by mass of short vinylon fibers and 16 parts by mass of short nylon fibers were used as the short fibers, and kneading the blended ingredients in the corresponding one of Principal Formulations 2-10. Comparative Examples 16-24 correspond to Principal Formulations 2-10, respectively.

The adhesion rubber layer, the reinforcement fabric, and the cord were composed of a rubber composition of the same type as the compression rubber layer, woven fabric made of nylon fibers, and a twisted yarn made of polyethylene naphthalate fibers (PEN), respectively. The belt length was 1210 mm, the belt width was 21.4 mm, and the belt thickness was 4.3 mm. The number of ribs was six.

COMPARATIVE EXAMPLES 25-33

As Comparative Examples 25-33, V-ribbed belts were fabricated in each of which a compression rubber layer was formed using an uncrosslinked rubber composition obtained by blending the ingredients in a corresponding one of Principal Formulations 2-10 in which 20 parts by mass of carbon black HAF and 55 parts by mass of carbon black GPF were used as the carbon black and 25 parts by mass of short nylon fibers were used as the short fibers, and kneading the blended ingredients in the corresponding one of Principal Formulations 2-10. Comparative Examples 25-33 correspond to Principal Formulations 2-10, respectively.

The adhesion rubber layer, the reinforcement fabric, and the cord were composed of a rubber composition of the same type as the compression rubber layer, woven fabric made of nylon fibers, and a twisted yarn made of polyethylene naphthalate fibers (PEN), respectively. The belt length was 1210 mm, the belt width was 21.4 mm, and the belt thickness was 4.3 mm. The number of ribs was six.

COMPARATIVE EXAMPLE 34

As Comparative Example 34, a V-ribbed belt was fabricated in which a compression rubber layer was formed using an uncrosslinked rubber composition obtained by blending the ingredients in Principal Formulation 1 in which 60 parts by mass of carbon black GPF were used as the carbon black and 10 parts by mass of short nylon fibers were used as the short fibers, and kneading the blended ingredients.

The other structures of the adhesion rubber layer, etc., are identical with those of Example 1.

COMPARATIVE EXAMPLE 35

As Comparative Example 35, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of polypropylene fibers (2) (Product Name: Simtex HT, Initial Tensile Resistance: 65-100 cN/dtex, Fiber Length: 1 mm, Aromatic Compound in Main Chain: None, made by UBE-NITTO KASEI CO., LTD.) were used as the carbon black and the short fibers, respectively, and kneading the blended ingredients.

The other structures of the adhesion rubber layer, etc., are identical with those of Example 1.

COMPARATIVE EXAMPLE 36

As Comparative Example 36, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of cotton (Product Name: Denim Chopper 5, Initial Tensile Resistance: 60-82 cN/dtex, Fiber Length: 5 mm, Aromatic Compound in Main Chain: None, made by HASHIMOTO KABUSHIKI-KAISHA) were used as the carbon black and the short fibers, respectively, and kneading the blended ingredients.

The other structures of the adhesion rubber layer, etc., are identical with those of Example 1.

COMPARATIVE EXAMPLE 37

As Comparative Example 37, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of short p-aramid fibers (Product Name: Technora, Initial Tensile Resistance: 520 cN/dtex, Fiber Length: 1 mm, Aromatic Compound in Main Chain: Yes, made by Teijin Limited.) were used as the carbon black and the short fibers, respectively, and kneading the blended ingredients.

The other structures of the adhesion rubber layer, etc., are identical with those of Example 1.

COMPARATIVE EXAMPLE 38

As Comparative Example 38, a V-ribbed belt was fabricated in which a compression rubber layer was formed using an uncrosslinked rubber composition obtained by blending the ingredients in Principal Formulation 1 in which 60 parts by mass of carbon black GPF and 10 parts by mass of short m-aramid fibers (Product Name: Conex, Initial Tensile Resistance: 64 cN/dtex, Fiber Length: 1 mm, Aromatic Compound in Main Chain: Yes, made by Teijin Limited.) were used as the carbon black and the short fibers, respectively, and kneading the blended ingredients.

The other structures of the adhesion rubber layer, etc., are identical with those of Example 1.

(Test Evaluation Method)

Figure 7:
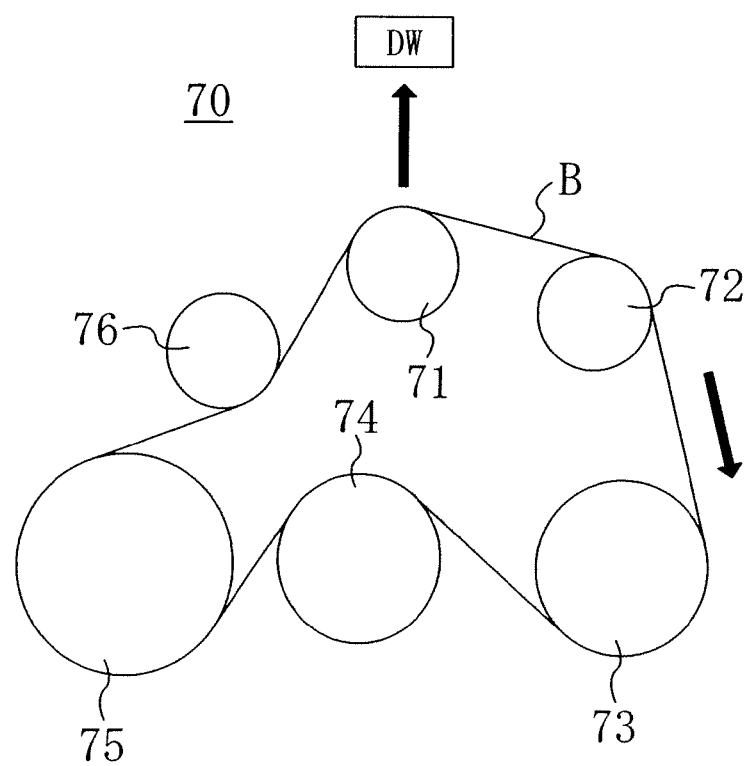
[FIG. 7]

FIG. 7 illustrates a layout of pulleys in a belt running tester 70 for use in test evaluation.

The belt running tester 70 includes an uppermost first driven ribbed pulley 71 of 61 mm diameter, a second driven ribbed pulley 72 of 61 mm diameter disposed downward and rightward from the first driven ribbed pulley 71, a drive ribbed pulley 73 of 101 mm diameter disposed downward and rightward from the second driven ribbed pulley 72, a first idler pulley 74 of 80 mm diameter disposed leftward from the drive ribbed pulley 73, a third driven ribbed pulley 75 of 120 mm diameter disposed leftward from the first idler pulley 74, and a second idler pulley 76 of 61 mm diameter disposed upward and rightward from the third driven ribbed pulley 75 and downward and leftward from the first driven ribbed pulley 71. The V-ribbed belt B is sequentially wrapped around the first driven ribbed pulley 71, the second driven ribbed pulley 72, the drive ribbed pulley 73, the first idler pulley 74, the third driven ribbed pulley 75, and the second idler pulley 76. Furthermore, the first driven ribbed pulley 71 is vertically movable, and can impose a dead weight on the V-ribbed belt B. The belt span length between the third driven ribbed pulley 75 and the first idler pulley 74 is 90 mm.

<Misalignment Amount in Noise Generation>

The V-ribbed belt of each of Examples 1-18 and Comparative Examples 1-38 was fitted on the belt running tester 70. The third driven ribbed pulley 75 was adjusted so that the amount of misalignment between the first idler pulley 74 and the third driven ribbed pulley 75 was 0.00°. In this state, a dead weight of 300 N (50 N per V-rib) was imposed on the first driven pulley 71, and rotation of the drive ribbed pulley at 1500 rpm under an ambient temperature of 5° C. allowed the belt to run clockwise. In this case, no load torque was imposed on either of the first driven pulley 71, the second driven pulley 72, and the third driven pulley 75.

Then, the amount of offset, i.e., misalignment, of the third driven ribbed pulley 75 was gradually changed to 4.00°. The amount of the misalignment in noise generation based on evaluation criteria described below was used as the misalignment amount in noise generation. As the evaluation criteria for noise generation, a method was used in which a noise meter was placed 30 cm away from the third driven ribbed pulley 75, and a determination was made that when the intensity of measured noise was at least 3 dB greater than that under a misalignment amount of 0.00°, noise had been generated.

As illustrated in FIG. 6, while the V-ribbed belt B was wrapped around the ribbed pulleys P1 and P2, and a predetermined magnitude of axial loading was applied to the pulleys, the distance C between the respective axes of the ribbed pulleys P1 and P2 was measured, and a forward or backward displacement ΔC of one of the pair of the ribbed pulleys, i.e., the ribbed pulley P2, with respect to the other pulley P1 at their axes was measured. In this manner, the misalignment amount a was determined using the following equation:

$$\alpha = \tan^{-1}(\Delta C/C).$$

<Noise Generation Running Time>

The V-ribbed belt of each of Examples 1-7, Examples 17-18, Comparative Examples 1-15, and Comparative Examples 34-38 was fitted on the belt running tester 70. The third driven ribbed pulley 75 was offset frontward so that the amount of misalignment between the first idler pulley 74 and the third driven ribbed pulley 75 was 2.00°, leading to misalignment due to displacement of the pulley. In this state, rotation of the drive ribbed pulley at 1500 rpm under an ambient temperature of 5° C. allowed the belt to run clockwise until noise based on the above evaluation criteria was generated. However, in Comparative Example 1, the belt did not run because noise was generated immediately after start of the test. When the belt was allowed to run, no load torque was imposed on either of the first driven pulley 71, the second driven pulley 72, and the third driven pulley 75. Here, the belt running time until generation of the noise was used as the noise generation running time. When the belt running time exceeded 300 hours, the test was aborted.

<Change in Friction Coefficient/Change in Belt Mass>

The coefficient of friction on the surface of the compression rubber layer of the V-ribbed belt of each of Examples 1-7 and Comparative Examples 1-15 and the mass of the belt were measured, and then the belt was fitted on the belt running tester 70. The third driven ribbed pulley 75 was adjusted so that the amount of misalignment between the first idler pulley 74 and the third driven ribbed pulley 75 was 0.00°. While a dead weight of 300 N (50 N per rib) was imposed on the first driven pulley 71, and a load torque of 5 Nm per rib was imposed on the third driven pulley 75, rotation of the drive ribbed pulley at 4500 rpm under an ambient temperature of 80° C. allowed the belt to run clockwise for 50 hours.

After the belt run, the coefficient of friction on the surface of the compression rubber layer and the belt mass were again measured, and thus the amount of change in the friction coefficient and the rate of change in the belt mass (wear rate of the belt) were calculated.

<Temperature of Driving Surface of Belt>

The coefficient of friction on the surface of the compression rubber layer of the V-ribbed belt of each of Examples 1-7 and Comparative Examples 1-15 and the mass of the belt were measured, and then the belt was again fitted on the belt running tester 70. The third driven ribbed pulley 75 was adjusted so that the amount of misalignment between the first idler pulley 74 and the third driven ribbed pulley 75 was 0.00°. While a dead weight of 300 N (50 N per rib) was imposed on the first driven pulley 71, and a load torque of 5 Nm per rib was imposed on the third driven pulley 75, rotation of the drive ribbed pulley at 4500 rpm under an ambient temperature of 80° C. allowed the belt to run clockwise.

When the belt running time was 100 hours, the temperature of the compression rubber layer forming the driving surface of the belt was measured by a non-contact thermometer.

<Cord Separation Time>

After the measurement of the temperature of the compression rubber layer, the belt run was continued until the separation of the cord (cord separation). Here, the belt running time until this cord separation was used as the cord separation time. When the belt running time exceeded 300 hours, the test was aborted.

<Noise Generated During Exposure to Water>

The V-ribbed belt of each of Examples 1-7 and Comparative Examples 1-15 was fitted to an accessory drive belt transmission system for an automobile. An engine of the automobile was started, and then idled for ten minutes with a corresponding air conditioner and corresponding headlights ON. Thereafter, when running water of approximately 100 ml was poured onto the V-ribbed belt, an observation was made whether or not noise based on the above evaluation criteria was generated.

<Belt Surface Temperature Immediately after Grinding Process>

The V-ribbed belt of each of Examples 1-7 and Comparative Examples 1-15 was ground by an abrasive wheel in a grinding process for forming V-ribs using the abrasive wheel, and then the temperature of the belt surface was measured by a non-contact thermometer which is 30 cm away from the belt.

(Test Evaluation Results)

The results of the test evaluations are illustrated in Tables 2-5.

TABLE 2

| | Examples | | | | | | |
|---|---|---|---|---|---|---|---|
| | 1 | 2 | 3 | 4 | 5 | 6 | 7 |
| EPDM (1) | 100 | 100 | 100 | 100 | 100 | 100 | 100 |
| Carbon Black ISAF | | | | | | | |
| Carbon Black HAF | | | | | | | |
| Carbon Black FEF | | | | | | | |
| Carbon Black GPF | 60 | | | 60 | 60 | 60 | 60 |
| Carbon Black SRF | | 65 | | | | | |
| Carbon Black MT | | | 80 | | | | |
| Short Vinylon Fibers | 10 | 10 | 10 | 18 | 16 | 10 | 10 |
| Short Nylon Fibers | | | | | 4 | 16 | 16 |
| Ultra-High-Molecular-Weight Polyethylene Powders | | | | | | | 10 |
| Misalignment Amount (Degree) in Noise Generation | 4 or more | 4 or more | 4 or more | 4 or more | 4 or more | 4 or more | 4 or more |
| Noise Generation Running Time (h) | 300 or more | 300 or more | 300 or more | 300 or more | 300 or more | 300 or more | 300 or more |
| Change in Friction Coefficient | 0.05 | 0.04 | 0.05 | 0.04 | 0.05 | 0.06 | 0.03 |
| Change in Belt Mass (Wear Rate %) | 1 | 1 | 1 | 0.7 | 0.8 | 0.9 | 0.7 |
| Temperature of Driving Surface of Belt (° C.) | 105 | 106 | 108 | 108 | 108 | 108 | 108 |
| Cord Separation Time (h) | 300 or more | 300 or more | 300 or more | 300 or more | 300 or more | 300 or more | 300 or more |
| Noise Generated During Exposure to Water | None | None | None | None | None | None | None |
| Belt Surface Temperature Immediately After Grinding Process (° C.) | 160 | 165 | 167 | 168 | 165 | 163 | 169 |

TABLE 3

| | Comparative Examples | | | | | | | |
|---|---|---|---|---|---|---|---|---|
| | 1 | 2 | 3 | 4 | 5 | 6 | 7 | 8 |
| EPDM (1) | 100 | 100 | 100 | 100 | 100 | 100 | 100 | 100 |
| Carbon Black ISAF | | | | | | 20 | 55 | 20 |
| Carbon Black HAF | | | | 20 | 60 | | | |
| Carbon Black FEF | 50 | 50 | 50 | | | | | |
| Carbon Black GPF | | | | 55 | 15 | 50 | 15 | |
| Carbon Black SRF | | | | | | | | 50 |
| Carbon Black MT | | | | | | | | |
| Short Vinylon Fibers | 18 | 16 | 10 | | | | | |
| Short Nylon Fibers | | 4 | 16 | 25 | 25 | 25 | 25 | 25 |
| Ultra-High-Molecular-Weight Polyethylene Powders | | | | | | | | |
| Misalignment Amount (Degree) in Noise Generation | 2 | 2.2 | 2.5 | 2.7 | 2.2 | 2.6 | 2.3 | 2.7 |
| Noise Generation Running Time (h) | — | 1 | 5 | 10 | 5 | 10 | 5 | 10 |
| Change in Friction Coefficient | 0.31 | 0.34 | 0.35 | 0.32 | 0.41 | 0.33 | 0.39 | 0.32 |
| Change in Belt Mass (Wear Rate %) | 0.6 | 0.6 | 0.7 | 1.5 | 1 | 1.5 | 1 | 1.6 |
| Temperature of Driving Surface of Belt (° C.) | 118 | 119 | 119 | 118 | 125 | 120 | 128 | 116 |
| Cord Separation Time (h) | 180 | 175 | 190 | 184 | 150 | 160 | 145 | 191 |
| Noise Generated During Exposure to Water | Yes | Yes | Yes | Yes | Yes | Yes | Yes | Yes |
| Belt Surface Temperature Immediately After Grinding Process (° C.) | 185 | 185 | 184 | 186 | 196 | 191 | 199 | 183 |

| | Comparative Examples | | | | | | |
|---|---|---|---|---|---|---|---|
| | 9 | 10 | 11 | 12 | 13 | 14 | 15 |
| EPDM (1) | 100 | 100 | 100 | 100 | 100 | 100 | 100 |
| Carbon Black ISAF | 50 | | | | | | |
| Carbon Black HAF | | 20 | 60 | 45 | | 15 | |
| Carbon Black FEF | | | | | | | |
| Carbon Black GPF | | | | 30 | 60 | 60 | 55 |

TABLE 3-continued

| | | | | | | | |
|---|---|---|---|---|---|---|---|
| Carbon Black SRF | 15 | 55 | 15 | | | | 15 |
| Carbon Black MT | | | | | | | |
| Short Vinylon Fibers | | | | | | | |
| Short Nylon Fibers | 25 | 25 | 25 | 25 | 25 | 25 | 25 |
| Ultra-High-Molecular-Weight Polyethylene Powders | | | | | | | |
| Misalignment Amount (Degree) in Noise Generation | 2.5 | 2.7 | 2.1 | 2.3 | 2.5 | 2.6 | 2.7 |
| Noise Generation Running Time (h) | 5 | 10 | 1 | 5 | 10 | 10 | 10 |
| Change in Friction Coefficient | 0.34 | 0.31 | 0.42 | 0.32 | 0.31 | 0.36 | 0.32 |
| Change in Belt Mass (Wear Rate %) | 1 | 1.5 | 1 | 1.3 | 2.3 | 2 | 2.5 |
| Temperature of Driving Surface of Belt (° C.) | 125 | 116 | 125 | 123 | 108 | 112 | 107 |
| Cord Separation Time (h) | 141 | 184 | 135 | 147 | 250 | 280 | 290 |
| Noise Generated During Exposure to Water | Yes | Yes | Yes | Yes | Yes | Yes | Yes |
| Belt Surface Temperature Immediately After Grinding Process (° C.) | 198 | 181 | 186 | 185 | 155 | 170 | 154 |

TABLE 4

| | Principal Formulations | | | | | | | | |
|---|---|---|---|---|---|---|---|---|---|
| | 2 | 3 | 4 | 5 | 6 | 7 | 8 | 9 | 10 |
| Misalignment Amount (Degree) in Noise Generation | Example 8<br>4 or more<br>Comparative Example 16<br>2.3<br>Comparative Example 25<br>2.5 | Example 9<br>4 or more<br>Comparative Example 17<br>2.5<br>Comparative Example 26<br>2.5 | Example 10<br>4 or more<br>Comparative Example 18<br>2.4<br>Comparative Example 27<br>2.4 | Example 11<br>4 or more<br>Comparative Example 19<br>2.2<br>Comparative Example 28<br>2.3 | Example 12<br>4 or more<br>Comparative Example 20<br>2.6<br>Comparative Example 29<br>2.7 | Example 13<br>4 or more<br>Comparative Example 21<br>2.2<br>Comparative Example 30<br>2.3 | Example 14<br>4 or more<br>Comparative Example 22<br>2.5<br>Comparative Example 31<br>2.4 | Example 15<br>4 or more<br>Comparative Example 23<br>2.4<br>Comparative Example 32<br>2.6 | Example 16<br>4 or more<br>Comparative Example 24<br>2.5<br>Comparative Example 33<br>2.5 |

TABLE 5

| | | Examples | | | Comparative Examples | | | | |
|---|---|---|---|---|---|---|---|---|---|
| | | 1 | 17 | 18 | 34 | 35 | 36 | 37 | 38 |
| EPDM (1) | | 100 | 100 | 100 | 100 | 100 | 100 | 100 | 100 |
| Carbon Black GPF | | 60 | 60 | 60 | 60 | 60 | 60 | 60 | 60 |
| Short Vinylon Fibers | Initial Tensile Resistance: 215 cN/dtex<br>Aromatic Compound in Main Chain: None | 10 | | | | | | | |
| Polyacetal Fibers | Initial Tensile Resistance: 141 cN/dtex<br>Aromatic Compound in Main Chain: None | | 10 | | | | | | |
| Polypropylene Fibers (1) | Initial Tensile Resistance: 100-140 cN/dtex<br>Aromatic Compound in Main Chain: None | | | 10 | | | | | |
| Short Nylon Fibers | Initial Tensile Resistance: 44 cN/dtex<br>Aromatic Compound in Main Chain: None | | | | 10 | | | | |
| Polypropylene Fibers (2) | Initial Tensile Resistance: 65-100 cN/dtex<br>Aromatic Compound in Main Chain: None | | | | | 10 | | | |
| Cotton | Initial Tensile Resistance: 60-82 cN/dtex<br>Aromatic Compound in Main Chain: None | | | | | | 10 | | |
| Short P-Aramid Fibers | Initial Tensile Resistance: 520 cN/dtex<br>Aromatic Compound in Main Chain: Yes | | | | | | | 10 | |
| Short M-Aramid Fibers | Initial Tensile Resistance: 64 cN/dtex<br>Aromatic Compound in Main Chain: Yes | | | | | | | | 10 |
| Misalignment Amount (Degree) in Noise Generation | | 4 or more | 4 or more | 4 or more | 2.3 | 2.5 | 2.1 | 4 or more | 4 or more |
| Noise Generation Running Time (h) | | 300 or more | 250 | 230 | 10 | 15 | 1 | 120 | 93 |

<Misalignment Amount in Noise Generation>

Tables 2-4 show that Examples 1-16 in each of which specific, short, high modulus fibers and large-particle-diameter carbon black were combined into the rubber composition forming the compression rubber layer exhibited a much greater misalignment amount in noise generation than Comparative Examples 1-33 in each of which none of them or either of them was contained. In other words, according to Examples 1-16, in the layout of the pulleys having a great amount of misalignment therebetween, noise generation can be more advantageously reduced than in Comparative Examples 1-33. Specifically, according to Examples 1-16, even when the misalignment amount is greater than 2.70°, noise arising from the misalignment is not generated until the misalignment amount exceeds 4° to thereby cause the belt to pass over the pulley so that evaluations cannot be continued. In other words, excellent noise prevention effects can be provided.

Table 5 shows that Examples 1, 17, and 18 exhibited a much greater misalignment amount in noise generation than Comparative Examples 34-36 in each of which the belt was made of the rubber composition into which short fibers having an initial tensile resistance of equal to or less than 100 cN/dtex were blended. In other words, according to Examples 1, 17, and 18, in the layout of the pulleys having a great amount of misalignment therebetween, noise generation can be more advantageously reduced than in Comparative Examples 34-36. Specifically, according to Examples 1, 17, and 18, even when the misalignment amount is greater than 2.70°, noise arising from the misalignment is not generated until the misalignment amount exceeds 4° to thereby cause the belt to pass over the pulley so that evaluations cannot be continued. In other words, excellent noise prevention effects can be provided.

<Noise Generation Running Time>

Tables 2 and 3 show that Examples 1-7 exhibited a much (30 or more times) longer noise generation running time than Comparative Examples 1-15. In other words, Examples 1-7 can more advantageously reduce noise generation than Comparative Examples 1-15 not only in an early stage of use of the belt but also permanently for long periods.

Table 5 shows that Examples 1, 17, and 18 exhibited a much longer noise generation running time than Comparative Examples 34-36 in each of which the belt was made of the rubber composition into which short fibers having an initial tensile resistance of equal to or less than 100 cN/dtex were blended and Comparative Examples 37-38 in each of which the belt was made of the rubber composition into which short fibers made of polymers having a main chain containing an aromatic compound were blended. In other words, Examples 1-7 can more advantageously reduce noise generation than Comparative Examples 1-15 not only in an early stage of use of the belt but also permanently for long periods. In particular, Example 1 significantly reduces noise generation.

<Change in Friction Coefficient/Change in Belt Mass>

Tables 2 and 3 show that Examples 1-7 exhibited a much smaller amount of change in the friction coefficient than Comparative Examples 1-15. Furthermore, Tables 2 and 3 also show that in each of Examples 1-7, the rate of change in the belt mass is approximately equal to or smaller than that in each of Comparative Examples 1-15. In other words, according to Examples 1-7, power can be more stably transmitted than in Comparative Examples 1-15.

<Temperature of Driving Surface of Belt>

Tables 2 and 3 show that in each of Examples 1-7, the temperature of the driving surface of the belt is approximately equal to or lower than that in each of Comparative Examples 1-15. In other words, in each of Examples 1-7, the amount of heat generated in the compression rubber layer during the belt run is relatively smaller than that in each of Comparative Examples 1-15.

<Cord Separation Time>

Tables 2 and 3 show that Examples 1-7 exhibited a much longer cord separation time than Comparative Examples 1-15. The reason for this is that the separation of the cord (cord separation) due to a heat-induced reduction in the adhesion of the cord is hardly caused because, as described above, in each of Examples 1-7, the amount of heat generated in the compression rubber layer during the belt run is relatively smaller than that in each of Comparative Examples 1-15.

<Noise Generated During Exposure to Water>

Tables 2 and 3 show that although, in each of Examples 1-7, noise based on the above evaluation criteria was not generated, noises were generated in all of Comparative Examples 1-15. In other words, according to Examples 1-7, noise generation can be advantageously reduced both in a real vehicle and in the presence of water.

<Belt Surface Temperature Immediately after Grinding Process>

Tables 2 and 3 show that in each of Examples 1-7, the belt surface temperature immediately after the grinding process is lower than that in each of Comparative Examples 1-15. The reason for this is also that in each of Examples 1-7, the amount of heat generated in the compression rubber layer is relatively smaller than that in each of Comparative Examples 1-15. In view of the above, the abrasive wheels used to manufacture the belts of Examples 1-7 have a longer life than those used to manufacture the belts of Comparative Examples 1-15.

INDUSTRIAL APPLICABILITY

As described above, the present invention is useful for a friction drive belt in which at least a contact part of its belt body with a pulley is made of a rubber composition and an automotive accessory drive belt transmission system using the same.

The invention claimed is:

1. A friction drive belt comprising:
    a substantially flat adhesion rubber layer including cord members;
    a compression rubber layer connected to the adhesion rubber layer on one side and including V ribs extending opposite from said adhesion rubber layer, wherein the composition of the compression rubber layer is uniform at all points from the surface of the V ribs to the adhesion rubber layer and includes:
    EPDM as the raw rubber material forming the compression layer, short fibers and carbon black both scattered within the EPDM so as to be exposed at a surface of at least a contact part of the compression rubber layer of a rubber belt body with a pulley, wherein the short fibers include at least one type of short fibers among short polyvinyl alcohol fibers, short polyacetal fibers, and short polypropylene fibers having a main chain which does not contain an aromatic compound and having an initial tensile resistance of equal to or greater than 100 cN/dtex,
    the carbon black has an average particle diameter of between about 49-500 nm and contains at least one of carbon black GPF, carbon black SRF, and carbon black MT having an iodine absorption of equal to or less than 40 g/Kg, and/or a specific surface area of equal to or less than 40 m$^2$/g,
    an amount of the short fibers blended into 100 parts by mass of a raw rubber material of a rubber composition forming the contact part with the pulley is about 5-30 parts by mass, and
    a sum of amounts of the carbon black GPF, the carbon black SRF, and the carbon black MT contained in 100 parts by mass of the raw rubber material of the rubber composition forming the contact part with the pulley is about 40-80 parts by mass.

2. An automotive accessory drive belt transmission system comprising:
    a V-ribbed belt wrapped around three or more pulleys including a pair of ribbed pulleys, wherein the V-ribbed belt is a rubber V-ribbed belt including a substantially flat adhesion rubber layer having cord members, and a compression rubber layer formed from EPDM and having a plurality of V-ribs which extend opposite from said adhesion rubber layer and inward of the belt and in a lengthwise direction of the belt and are arranged in parallel with each other in a widthwise direction of the belt, wherein the composition of the compression rubber layer is uniform at all points from the surface of the V ribs to the adhesion rubber layer and include short fibers and carbon black both scattered within the EPDM so as to be exposed at a surface of at least a contact part of a body of the V-ribbed belt with a pulley, the short fibers include at least one type of short fibers among short polyvinyl alcohol fibers, short polyacetal fibers, and short polypropylene fibers having a main chain which does not contain an aromatic compound and having an initial tensile resistance of equal to or greater than 100 cN/dtex, and the carbon black has an average particle diameter of between about 49-500 nm and contains carbon black GPF having an iodine absorption of equal to or less than 40 g/Kg, and/or a specific surface area of equal to or less than 40 $m^2/g$, an amount of the short fibers blended into 100 parts by mass of a raw rubber material of a rubber composition forming the contact part with the pulley is about 5-30 parts by mass, and an amount of the carbon black GPF contained in 100 parts by mass of the raw rubber material of the rubber composition forming the contact part with the pulley is about 40-80 parts by mass.

3. The automotive accessory drive belt transmission system of claim 2, wherein the three or more pulleys include a pair of adjacent pulleys where the amount of misalignment between the pulleys is greater than 2.70°, around which the V-ribbed belt is wrapped, and at least one of which is a ribbed pulley.

4. The automotive accessory drive belt transmission system of claim 1, wherein the surface of the contact part of the rubber belt body includes surface portions of the rubber belt body between the scattered short fibers and carbon black.

5. The automotive accessory drive belt transmission system of claim 2, wherein the surface of the contact part of the rubber belt body includes surface portions of the rubber belt body between the scattered short fibers and carbon black.

6. The friction drive belt of claim 1, wherein the short fibers further include short nylon fibers.

7. The friction drive belt of claim 6, wherein the short fibers further include ultra-high-molecular-weight polyethylene powders.

8. The automotive accessory drive belt transmission system of claim 2, wherein the short fibers further include short nylon fibers.

9. The automotive accessory drive belt transmission system of claim 8, wherein the short fibers further include ultra-high-molecular-weight polyethylene powders.

* * * * *